UNITED STATES PATENT OFFICE.

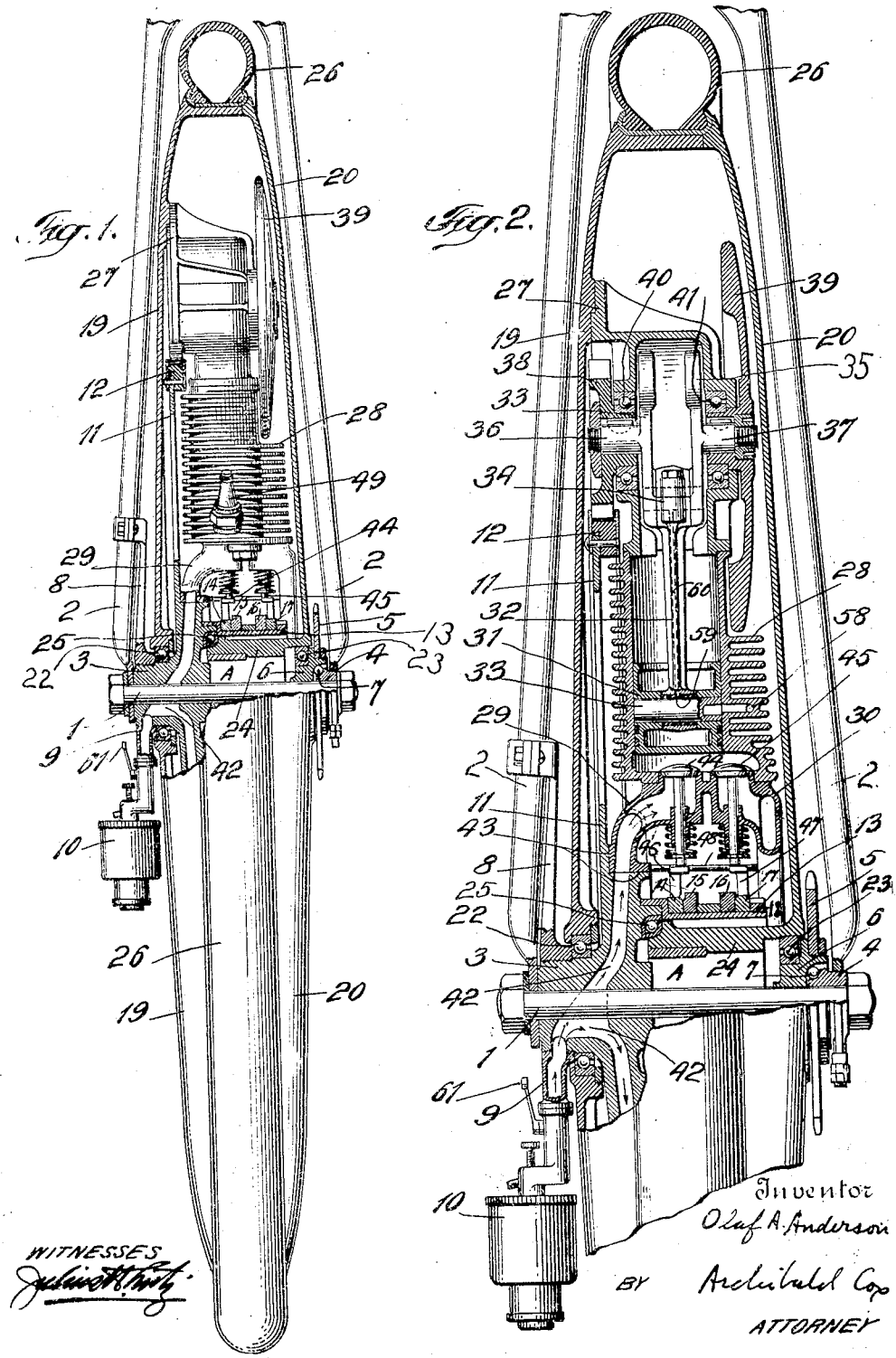
O. A. ANDERSON.
MOTOR WHEEL.
APPLICATION FILED JULY 12, 1916.
1,284,970.
Patented Nov. 19, 1918.
2 SHEETS—SHEET 1.
Inventor
Olaf A. Anderson
BY Archibald Cox
ATTORNEY
WITNESSES

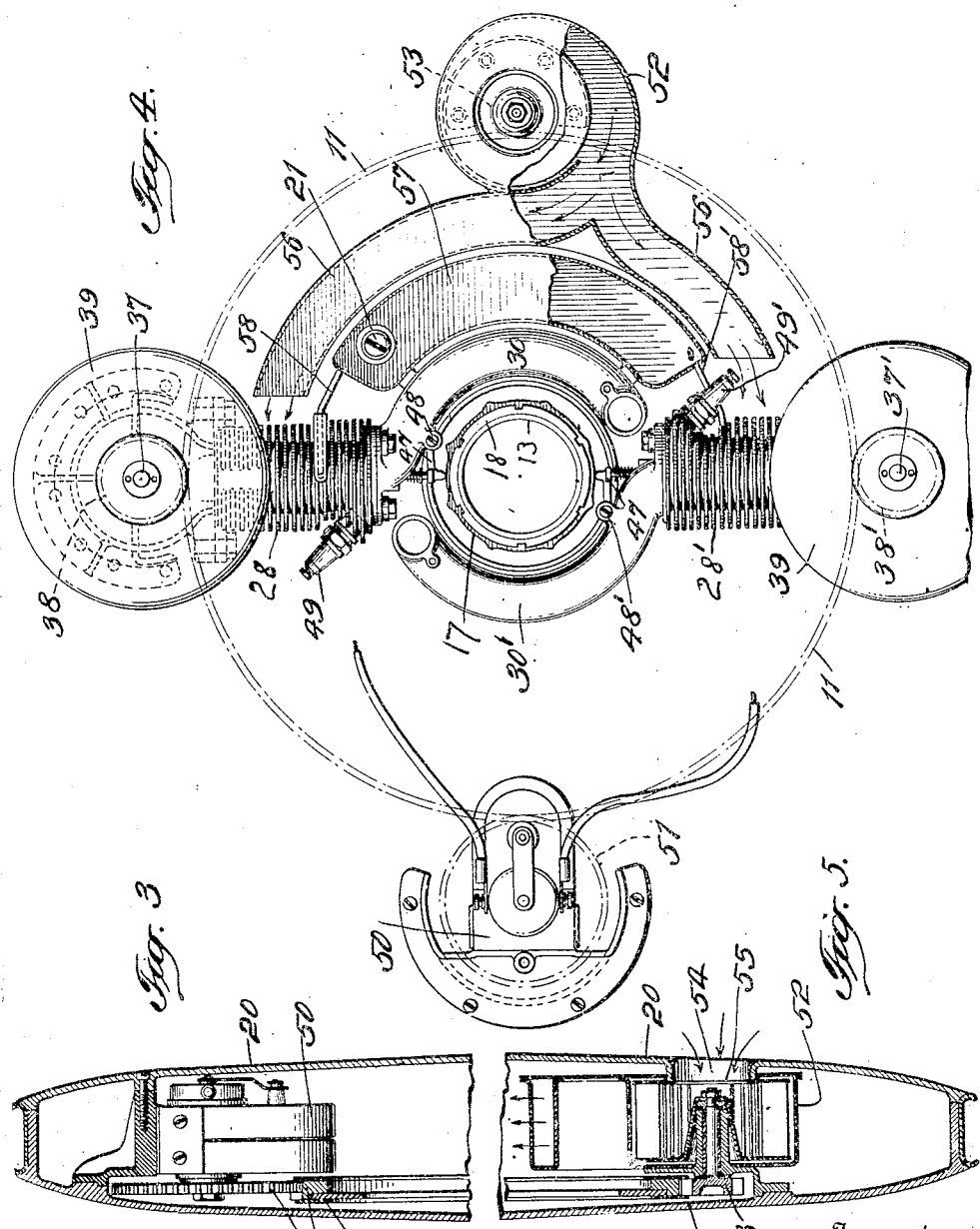

OLAF A. ANDERSON, OF HIGHLAND PARK, MICHIGAN.

MOTOR-WHEEL.

1,284,970.

Specification of Letters Patent.

Patented Nov. 19, 1918.

Application filed July 12, 1916. Serial No. 108,782.

*To all whom it may concern:*

Be it known that I, OLAF A. ANDERSON, a citizen of the United States, and a resident of Highland Park, in the county of Wayne and State of Michigan, have invented certain new and useful Improvements in Motor-Wheels, of which the following is a specification.

My invention relates to motor-wheels and has for an object to produce a self-contained motor-wheel which may be attached to the rear forks of an ordinary bicycle in place of the ordinary rear wheel and may thus convert the bicycle into a motorcycle. To accomplish this object and to produce a motor-wheel of simple construction and capable of inexpensive manufacture, I make use of a plurality of small gasolene motors attached directly to the wheel and rotating therewith.

In order that my invention may be clearly understood, I will describe in detail the embodiment of it which is illustrated in the accompanying drawings, in which—

Figure 1 is an end elevation, partly in section, of my motor-wheel attached to the rear forks of a bicycle.

Fig. 2 is an enlarged fragmentary view similar to Fig. 1 but showing one of the motors in section.

Fig. 3 is a sectional view of my wheel taken at right-angles to the section shown in Figs. 1 and 2, said sectional view being horizontally through that portion of the mechanism shown at the left-hand side of Fig. 4.

Fig. 4 is a diagrammatic side-view of my motor-wheel showing the operative relation of the mechanisms contained in the wheel, and Fig. 5 is a sectional view, corresponding with Fig. 3, through that portion of the mechanism shown at the right-hand side of Fig. 4.

My wheel, like an ordinary bicycle wheel, is supported by a fixed axle 1 passing through holes in the lower end of the rear forks 2. Upon the fixed axle 1 is mounted a fixed hub 3 and a fixed cone 4. The sprocket-wheel 5 is attached to the sprocket-hub 6, which is mounted by a ball-bearing 7 upon the fixed cone 4. The inner surface of the sprocket-hub 6, is arranged to engage an ordinary coaster-brake to be inserted in the space A. Upon the outer end of the fixed hub 3 is screwed a member comprising the arm 8 which is attached to the rear fork to prevent the hub 3 from rotating and the hollow arm 9, to which the carbureter 10 is attached. The fixed gear-wheel 11 is integral with or attached to the fixed hub 3. As shown in the drawings, the gear-wheel 11 has a fiber gear. An annular strip of fiber 12, takes the place of the gear-teeth of an ordinary gear-wheel. Attached to the right-hand side of the fixed hub 3 is a fixed barrel 13, upon which the fixed valve cams 14, 15, 16, 17, are mounted and held in place by a nut 18.

The rotary part of the device or wheel proper consists of a shell composed of two sections 19, 20, rigidly attached to each other. The outer periphery of the shell-section is formed like the rim of an ordinary bicycle wheel and upon it is mounted the tire 26. All the mechanism in the wheel is attached to the shell-section 19, so that the section 20 may easily be removed if it is necessary to obtain access to the mechanism. The left-hand shell-section 19 is mounted upon the fixed hub 3 by means of the ball-bearing 22, while the right-hand section 20 is mounted upon the sprocket-hub 6 by means of the ball-bearing 23. This section 20 is extended inwardly to form the revolving barrel 24, adapted to fit around an ordinary coaster-brake to be placed in the space A. A ball-bearing 25 is provided between the rotary barrel 24 and the inner side of the fixed hub 3.

Two gasolene motors are used in the embodiment of my invention shown in the drawings. These motors are placed at diametrically opposite points of the wheel-shell and have their cylinders radially arranged. The crank-case of each motor is at the outer end of its cylinder. As the two motors are exactly alike, a description of one of them (shown best in Figs. 1 and 2) will suffice. The engine consists of a crank-case 27, which is rigidly attached to the shell-section 19. To the inner end of the crank-case 27 is attached the cylinder 28 and to the inner end of the cylinder are attached the intake manifold 29 and the exhaust-pipe 30. The exhaust-pipe 30 (as best shown in Fig. 4) extends around the cam-barrel 13 and is at its extremity attached to the shell-section 20. The end of the exhaust-pipe 30 registers with an aperture in said shell-section.

The driving members of the motor consist of the piston 31, to which the connecting-rod 32 is attached by means of the hollow wrist-pin 33. The outer end of the connecting-rod 32 surrounds the crank-pin 34 of the balanced crank 35. Integral with or rigidly attached to the crank 35 are the stub-shafts 36, 37, upon which are keyed the gear-wheel 38 and the fly-wheel 39, respectively. The stub shafts are mounted upon the ball-bearing 40 between the hub of the gear 38 and the crank-case 27 and the ball-bearing 41 between the hub of the fly-wheel 39 and the crank-case. The gear-wheel 38 meshes with the fixed gear-wheel 11 and has a planetary motion around that gear.

The gasolene is supplied to the carbureter 10 from a tank carried upon the frame of the bicycle. The tank may preferably be hung from the upper bar of the frame.

The explosive mixture is drawn to the motors from the carbureter 10 through the radial channels 42 in the fixed hub 3. The annular portion of the intake manifold 29 surrounds the ends of said radial channels 42 having a gas-tight but running fit with the fixed hub 3 at 43. From the annular portion of the intake manifold the gas passes to the pipe-shaped portion which connects with the cylinder 28.

The valves 44, 45, control the admission of the mixture and the exhaust of the products of combustion from the cylinder. The stems of these valves rest upon latches 46, 47, against which they are forced by springs. The latches are hinged upon a pin 48 extending from the exhaust-pipe 30 to the intake manifold 29, and ride upon the cams 14 and 17.

A single carbureter 10 supplies the explosive mixture for all the motors and a single intake manifold 29 connects with the cylinders of all the motors. A single fixed gear-wheel 11 meshes with the gears of all the motors.

The ignition is accomplished by means of spark-plugs 49, 49'. Electric current is supplied to these plugs at the proper time by the magneto and timer 50 (Figs. 3 and 4), which is attached to and carried by the wheel-shell. The magneto is driven by a gear-wheel 51, which meshes with the fixed gear 11.

A blower 52 is preferably provided. In the drawings I have shown a small Sirocco blower attached to the wheel-shell opposite the dynamo. The blower is driven by a small gear 53 meshing with the fixed gear 11. The blower draws air through an aperture 54 in the shell section 20. A screen 55 is placed across this aperture. The air from the blower is led by the pipes 56 to the cylinders of the motors. The air leaves the wheel-shell through one or more apertures (not shown) which are preferably placed in the portion of the shell which is on the opposite side of the motors from the blower. The air current serves to cool the motors and to prevent dust from accumulating in the wheel-shell.

An oil reservoir 57 (Fig. 4) is placed between the air pipes 56 and the exhaust-pipe 30. The reservoir is attached to the exhaust-pipe 30 and the intake manifold 29, and has a plugged hole 21, registering with a hole in the shell-section 20, through which the reservoir may be filled. Oil passes from the reservoir to the cylinders through the pipes 58, 58'. Part of this oil enters the hollow wrist-pin 33. (See Fig. 2). The oil passes from the interior of the wrist-pin through an aperture 59 registering with the small bore 60 in the connecting-rod 32. A portion of the oil serves to lubricate the bearing of the connecting-rod on the wrist-pin, while part of the oil passes through the bore 60 and lubricates the crank-pin bearing. The ball-bearings 40, 41, as well as the bearings of the magneto and the blower may be lubricated by oil carried from the reservoir to these bearings through small pipes. To avoid confusion, these pipes have not been shown in the drawings. As the oil reservoir is placed nearer the center of the wheel than the points at which the oil is used, the oil is fed to these points by centrifugal force when the wheel is rotated. If desired, the oil may be fed positively by a small pump carried by the wheel-shell and driven by a gear meshing with the fixed gear 11.

The operation of my motor-wheel is as follows: In starting, the rider rotates the wheel by means of a pedal-chain which passes around the sprocket 5. This rotation cranks the motors and also produces current from the magneto to cause the ignition. As soon as the explosions begin, the planetary motion of the gear-wheels upon the motor-shafts around the fixed gear 11 causes continued rotation of the wheel-shell. The rider may then cease pedaling and hold his feet still, as in coasting down hill with a bicycle equipped with a coaster-brake. The speed of the vehicle is controlled by manipulation of the throttle-valve 61, which is connected to a controlling lever on the handle-bar or at some other convenient point.

The ratio between the fixed gear-wheel 11 and the gear-wheels upon the motor-shaft is 8:1, so that if four-cycle motors are used, as shown in the drawings, each motor will have four explosions or power impulses for each rotation of the wheel. The cams and timer are so arranged that the explosion-stroke of one engine is simultaneous with an intake-stroke of the other motor. Considering the two motors together, therefore, there are eight evenly-spaced power impulses for each rotation of the wheel.

This necessarily results in very smooth running.

I wish it clearly understood that my invention is by no means limited to the precise embodiment of it which I have illustrated and described.

What I claim is:—

1. The combination of a fixed gear, a rotary wheel bearing a plurality of internal combustion motors, gears on the shafts of said motors meshing with said fixed gear, a fixed carbureter, and means for supplying gas from said carbureter to said motors.

2. The combination of a fixed member, a rotary wheel bearing a plurality of internal combustion motors having cylinders and crank-shafts, and means connecting said crank-shafts with said fixed member so that the rotation of said crank-shafts causes said wheel to rotate, and means controlling the exhaust of gas from said cylinders comprising a member carried by said wheel and a fixed member coöperating therewith.

3. The combination of a fixed axle, a rotary wheel mounted thereon, a plurality of internal combustion motors attached to said wheel, gears on the shafts of said motors, and a fixed gear-wheel mounted on said fixed axle and meshing with said gears driven by said motors, and means controlling the exhaust from said engines comprising a member upon said axle and a coöperating member carried by said wheel.

4. The combination of a rotary wheel bearing a plurality of internal combustion motors with their cylinders arranged radially with respect to said wheel and their crank cases at the outer ends of their cylinders, a gear-wheel driven by each of said motors, and a fixed gear-wheel meshing with said motor gear-wheels.

5. The combination of a fixed member and a rotary wheel bearing a plurality of internal combustion motors with their cylinders arranged radially with respect to said wheel and their crank-shafts at the outer ends of their cylinders, means for connecting said crank-shafts with said fixed member whereby the rotation of said crank-shafts causes said wheel to rotate.

6. The combination of a fixed carbureter and a wheel bearing a plurality of internal combustion motors, and means for supplying explosive mixture from said carbureter to said motors.

7. The combination of a fixed carbureter and a wheel bearing a plurality of internal combustion motors and means for supplying explosive mixture from said carbureter to said motors comprising a fixed hub containing a radial channel connected with said carbureter and an annular manifold connected with said motors and having a running fit upon said hub.

8. The combination of a wheel-shell composed of two sections, one of which forms the rim of the wheel, a tire surrounding said rim, and a plurality of eccentrically placed motors within said shell and attached only to the one of said sections which forms the rim.

9. The combination of a rotary wheel, an internal combustion motor attached to said rotary wheel having an ignition device and driving a pinion meshing with a fixed gear wheel, a dynamo attached to said rotatable wheel and driven by a pinion meshing with a fixed gear-wheel, and an electrical connection between said magneto and said spark plug.

10. The combination of a fixed gear-wheel and a coaxial rotatable wheel bearing an internal combustion motor driving a pinion meshing with said fixed gear-wheel, a blower driven by a pinion meshing with said gear-wheel, and means directing a current of air produced by said blower against the cylinder of said motor.

11. The combination of a rotatable wheel, an internal combustion motor attached to said rotatable wheel and driving a pinion meshing with said fixed gear-wheel, a blower attached to said rotatable wheel and driven by a gear meshing with a fixed gear-wheel, and means for directing the current of air produced by said blower against the cylinder of said motor.

12. The combination of a fixed carbureter and a plurality of rotating motor cylinders and means for conducting explosive mixture from said carbureter to said cylinders comprising a fixed hub having a radial channel connected with said carbureter and an annular manifold connected with said cylinders and having a running fit upon said hub.

13. The combination of a rotatable motor-wheel containing bearings, an oil reservoir carried by said wheel and nearer its center than said bearings, and passages leading from said reservoir to said bearings, whereby the oil in said reservoir is fed to said bearings by centrifugal force when the motor-wheel is rotating.

14. The combination of a fixed axle, fixed cams mounted upon said fixed axle, a rotary wheel mounted upon said fixed axle, a plurality of internal combustion motors carried by said rotary wheel and having valves, operating means for said valves carried by said rotary wheel and contacting with said fixed cams.

15. The combination of a fixed axle, a rotary wheel-shell mounted thereon, a plurality of motors attached to the interior of said shell, gears upon the shafts of said motors, a fixed gear upon said fixed axle within said shell and meshing with said gears on said motor shafts.

16. The combination of a wheel-shell, an internal combustion motor within said shell, a blower arranged to draw air through a screened aperture in said shell, and an air outlet aperture in said shell.

17. The combination of a wheel-shell having a screened aperture and an outlet aperture, an internal combustion motor within said wheel-shell, a blower within said wheel-shell arranged to draw air through said screened aperture, and means for conducting the air current produced by said blower against the cylinder of said motor.

18. The combination of a fixed axle, a fixed gear-wheel upon said fixed axle, a coaster-brake upon said fixed axle, a sprocket-wheel rotatably mounted upon said fixed axle connected with the inner member of said coaster-brake, a wheel rotatably mounted upon said fixed axle and engaging the outer member of said coaster-brake and carrying a motor, a gear upon the shaft of said motor meshing with said fixed gear.

19. The combination of a fixed axle, a fixed member mounted thereon, a coaster-brake mounted on said fixed axle, a sprocket-wheel rotatably mounted on said fixed axle and engaging the inner member of said coaster-brake, a wheel rotatably mounted upon said fixed axle, a motor coacting with said wheel and said fixed member to cause said wheel to rotate.

20. The combination of a fixed axle, a fixed hub mounted upon one end thereof, a sprocket-wheel having a hub rotatably mounted upon the other end of said fixed axle, a wheel-shell rotatably mounted upon said fixed hub and upon said sprocket hub.

OLAF A. ANDERSON.